United States Patent [19]
Yoshida

[11] Patent Number: 5,303,047
[45] Date of Patent: Apr. 12, 1994

[54] CONTOUR COMPENSATION CIRCUIT FOR A SIGNAL PROCESSING APPARATUS OF AN IMAGE RECORDING AND REPRODUCTION APPARATUS

[75] Inventor: Masaji Yoshida, Yokohama, Japan
[73] Assignee: Victor Company of Japan, Ltd., Yokohama, Japan
[21] Appl. No.: 723,176
[22] Filed: Jun. 28, 1991

[30] Foreign Application Priority Data
Jun. 28, 1990 [JP] Japan .................. 2-170851

[51] Int. Cl.$^5$ .......................................... H04N 5/208
[52] U.S. Cl. ................................ 348/607; 348/625
[58] Field of Search ............ 358/160, 162, 166, 96, 358/37, 167; H04N 5/14, 5/208

[56] References Cited

U.S. PATENT DOCUMENTS
4,541,014  9/1985  Yagi .................... 358/166
4,994,915  2/1991  Takahashi et al. ........ 358/162

FOREIGN PATENT DOCUMENTS
62-189880  8/1987  Japan ............. H04N 5/208
63-122368  5/1988  Japan ............. H04N 5/208
63-287175  11/1988  Japan ............. H04N 5/208

Primary Examiner—James J. Groody
Assistant Examiner—Glenton B. Burgess
Attorney, Agent, or Firm—Jacobson, Price, Holman & Stern

[57] ABSTRACT

A contour compensation circuit comprises a first delay circuit to generate a first signal that is the image signal delayed by a first required time, a second delay circuit to generate a second signal that is the result of addition of the input image signal and the signal that is the input image signal delayed by twice the required time, a subtractor circuit that generates a third signal that is the first signal subtracted by the second signal, an adder circuit that adds the first signal and third signal and outputs contour compensation signal, and a control circuit to control the ratio of addition of the third signal in response to the second signal. On the basis of the second signal, the control circuit is configured from a voltage control amplifier (VCA) that controls a voltage gain of a signal so that the higher a level of the second signal is the larger a contour compensation amount becomes.

8 Claims, 4 Drawing Sheets

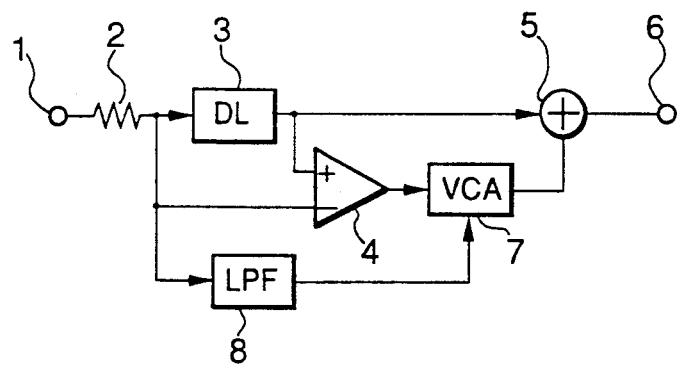
F I G. 5
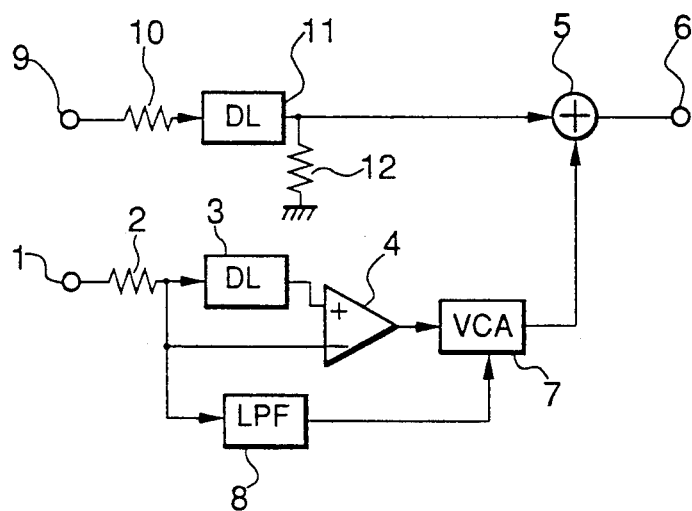
F I G. 6
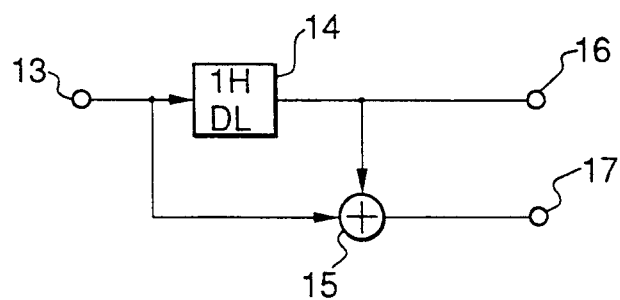
F I G. 7

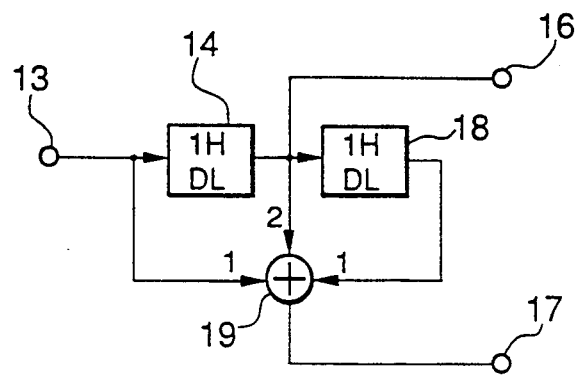
F I G . 8
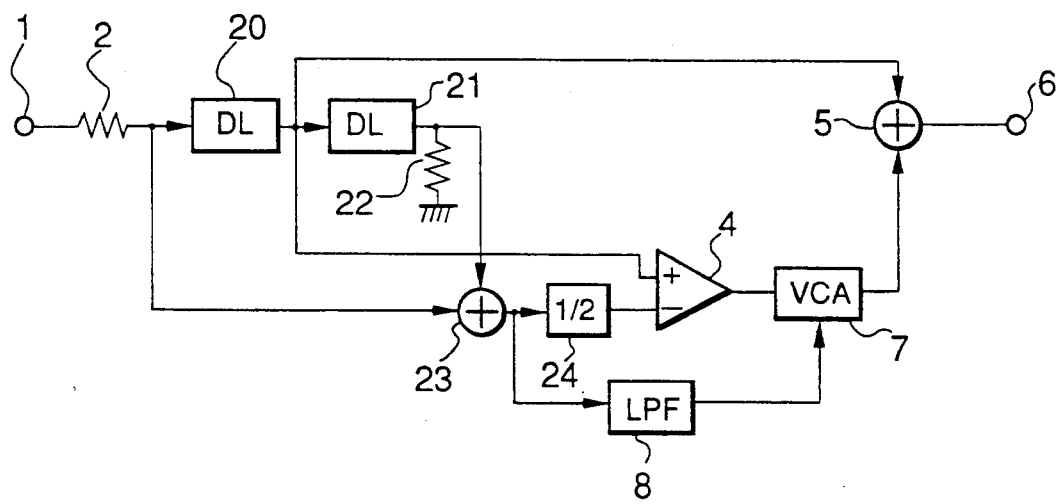
F I G . 9

CONTOUR COMPENSATION CIRCUIT FOR A SIGNAL PROCESSING APPARATUS OF AN IMAGE RECORDING AND REPRODUCTION APPARATUS

BACKGROUND OF THE INVENTION

The present invention relates to an image recording and reproduction apparatus, and more specifically, to a contour compensation circuit (image enhancer) used for a signal processing circuit in a VTR, a video display apparatus, a video camera and the like.

The following is a description of the prior art, with reference to FIG. 1 of the appended drawings. An image signal $S_a$ is inputted to an input terminal 31 and is also inputted to a delay line 33 after passing an input matching resistor 32. The delay line 33 delays the signal by a required time $t_d$. The signal that has been delayed by the delay line 33 is inputted to the positive input of a subtractor 34 and to one of the input terminals of an adder 35. The output side of the delay line 33 is received by a high impedance and so a reflection action is generated at the output terminal of the delay line 33 and this reflected signal is further delayed and transmitted to the input side of the delay line 33. The input signal and the signal that has been delayed by twice the required time $2t_d$ are added by the input matching resistor 32 and are inputted to the negative input of the subtractor 34. Moreover, the output of the subtractor 34 is supplied to the other input of the adder 35. And a signal of those input image signals and for which the contour portion is emphasized is outputted from the adder 35 to an output terminal 36. Moreover, FIG. 2 shows the signals at various portions, with FIG. 2 (a) showing the image signal $S_a$ that is inputted to the input terminal 31, FIG. 2 (b) showing the signal $S_b$ that is delayed by a time $t_d$ by the delay line 33, FIG. 2 (c) showing the signal $S_c$ which is obtained by addition at the matching resistor 32 of the input signal $S_a$ and the signal reflected at the output terminal of the delay line 33 and delayed by a time $2t_d$. FIG. 2 (d) shows the output signals $S_d$ of the subtractor 34, and FIG. 2 (e) shows the output signals $S_e$ of the adder 35 that adds the signals $S_b$ and the signals $S_d$.

The problem with this prior art is that the noise in the high-frequency band is also emphasized along with the contour portion of the image signal. As a result, this noise becomes conspicuous when the image signal is of low level. Because of this, the degree of emphasis of the contour portion of the image signal can be controlled in accordance with the level of the image signal, but with the prior art, it is difficult to perform such control so that it seems natural.

SUMMARY OF THE INVENTION

In order to eliminate this problem described above for the prior art, the present invention provides a contour compensation circuit that can control the degree of emphasis of the contour portion of an image signal in accordance with the level of the image signal.

In order to attain this objective described above, the contour compensation circuit of the present invention is provided with a first element for providing a first signal by delaying an input image signal by a predetermined time; a second element for providing a second signal which represents a sum of the input image signal and the input image signal which has been delayed by twice the predetermined time; a third elements for providing a third signal by subtracting the second signal from the first signal; a fourth element for controlling the magnitude of the third signal, in response to said second signal; and a fifth element for adding an output signal magnitude-controlled by and outputted from the fourth element to the first signal, thereby to obtain a contour-compensated image signal.

In a contour compensation circuit having the configuration described above, the ratio of addition of the third signal with respect to the first signal is controlled in accordance with the second signal. Accordingly, an image without conspicuous noise can be obtained.

As has been described above, according to the contour compensation circuit of the present invention, the ratio of addition of the third signal with respect to the first signal is controlled in accordance with the second signal and so contour compensation of the image signals is performed with a good balance and the compensation of the contour can be made less at places where the signal level is low and so it is possible to prevent the disadvantage of conspicuous noise at low levels, and the circuit can also be made an IC easily.

BRIEF DESCRIPTION OF THE DRAWINGS

In the accompanying drawings:

FIG. 5 is a block diagram showing the configuration of a contour compensation circuit according to a second embodiment of the present invention;

FIG. 6 is a block diagram showing the configuration of a contour compensation circuit according to a third embodiment of the present invention;

FIG. 7 is a block diagram showing a circuit according to a fourth embodiment and which generates image signals that are supplied to input terminals of a circuit according to a third embodiment of the present invention and which is shown in FIG. 6;

FIG. 8 is a block diagram showing a circuit according to a fifth embodiment and which generates image signals that are supplied to input terminals of a compensation circuit having the same configuration as that shown in FIG. 6; and FIG. 9 is a block diagram showing a contour compensation circuit according to a sixth embodiment of the present invention.

DETAILED DESCRIPTION OF THE PREFERRED EMBODIMENTS

Figure 1:
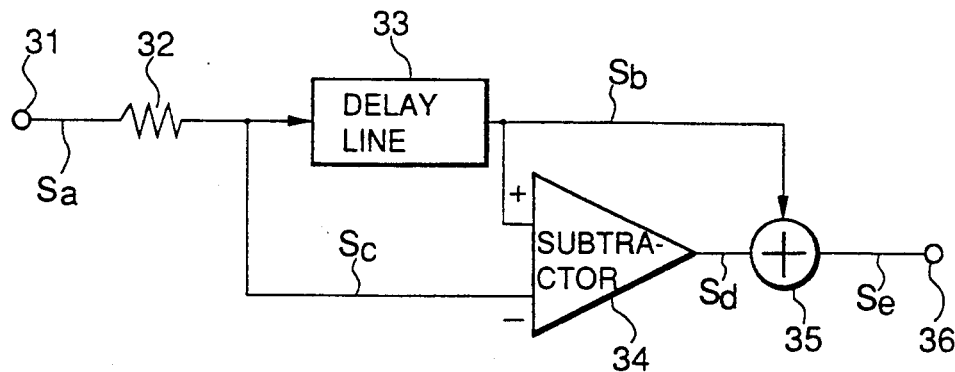
FIG. 1 is a block diagram showing the configuration of one example of a conventional contour compensation circuit.
Figure 2:
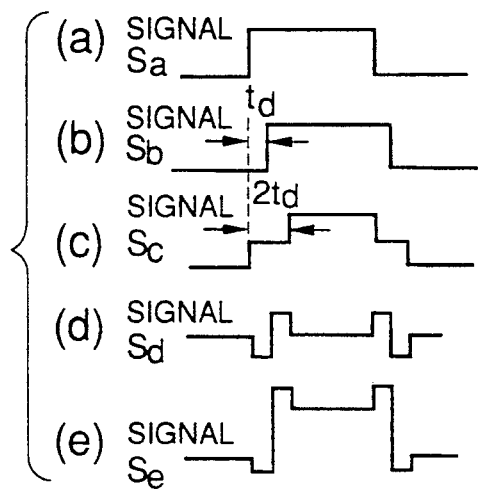
FIG. 2 is a diagram showing the signal waveforms at various portions of the circuit shown in FIG. 1.
Figure 3:
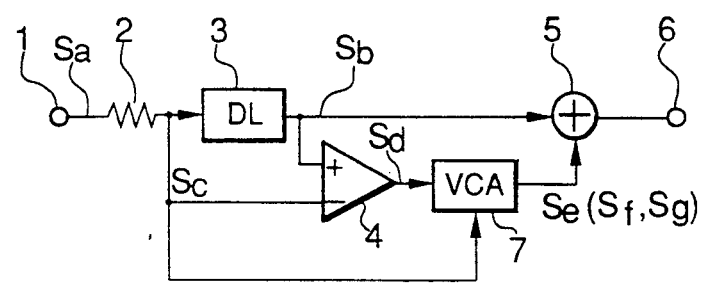
FIG. 3 is a block diagram showing the configuration of a contour compensation circuit according to a first embodiment of the present invention.
Figure 4:
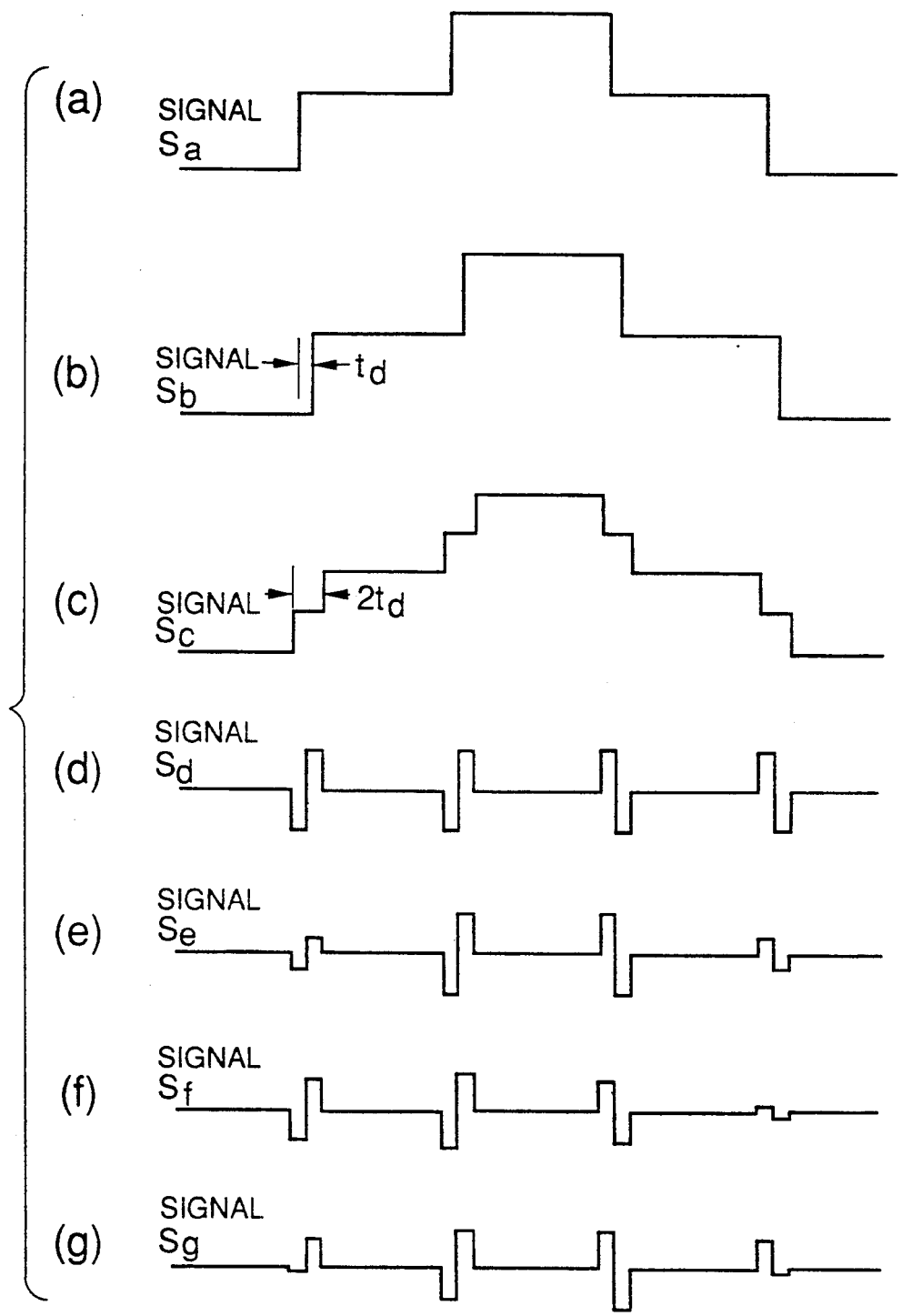
FIG. 4 is a diagram showing the signal waveforms at various portions of the circuit shown in FIG. 3.

The following is a description of a first embodiment, with reference to FIGS. 3 and 4. When the signal $S_a$ is inputted, the signal $S_b$ that has passed along a delay line 3 having the delay time $t_d$ is inputted to the positive input terminal of a subtractor 4 and is also supplied to one input of an adder 5. Also, the input signal $S_a$ is reflected by the output terminal of the delay line 3 and after it has been delayed by the time $2t_d$, becomes the signal $S_c$ with being added to the input signal $S_a$ at an input matching resistor 2. This signal $S_c$ is inputted to the negative input terminal of the subtractor 4. The subtractor 4 subtracts the signal $S_c$ of the negative input terminal of the subtractor 4 from the signal $S_b$ of the positive input terminal, and outputs the signal $S_d$.

If this signal $S_d$ is added as it is to the signal $S_b$ at the adder 5, there occur conspicuous high-frequency noises at places where the levels of the signal $S_b$ are not high. Therefore, the level of the signal $S_c$ is used to control the voltage gain of a voltage-controlled amplifier (VCA) 7. By this, the output of the voltage control amplifier 7 becomes the signal $S_e$ and it is possible to reduce the amount of compensation of the contour at place where the level of the signal $S_d$ is low, and to perform contour compensation and obtain an image that does not have conspicuous noise.

If the input signal $S_a$ is used to directly control the voltage-controlled amplifier 7, there occurs an imbalance in the contour compensation signal at the raising edge and the falling edge as in the case of the signal $S_f$. And if the contour compensation is performed by this signal, the image appears unnatural. Not only this, if the signal $S_b$ is used to control the voltage-controlled amplifier, the contour compensation signal becomes the signal $S_g$ and an imbalance occurs.

Moreover, when high-frequency components are included in the input image signal, this high-frequency signal components control the voltage control amplifier and the contour compensation signal is amplitude modulated by that high-frequency signal components. With respect to this, as in the case of the second embodiment shown in FIG. 5, it is desirable that the voltage-controlled amplifier 7 be controlled by a signal that has passed through a low-pass filter (LPF) 8.

The following is a description of other embodiments of the present invention, with reference to FIGS. 6 through 8.

In the first and second embodiments shown in FIG. 3 and FIG. 5, the objective image signal (the signal which is intended to be contour-compensated) and the image signal for making the contour compensation signal is the same and inputted to an input terminal 1.

With respect to this, in the third embodiment shown in FIG. 6, the objective image signal and the image signals for contour compensation can be separate.

In the third embodiment shown in FIG. 6, the image signal for making the contour compensation signal is inputted to the input terminal 1 and the contour compensation signal is made in the same manner as for the second embodiment shown in FIG. 5, and is supplied to one of the input terminals of the adder 5.

With respect to this, the objective image signal is inputted to an input terminal 9 and passes through the resistor 10 and a delay line 11 that has the same delay amount $t_d$ as the delay line 3 and is inputted to the other input terminal of the adder 5. This adder 5 adds the contour compensation signal to the objective image signal and outputs to the output terminal 6. Moreover, a resistor 12 is an output matching resistor of the delay line 11.

The objective image signals that is inputted to the input terminal 9 and the image signal for making the contour compensation signal that is input to the input terminal 1 are generated by a circuit such as that shown in FIG. 7, for example.

For the signal which makes the compensation signal, to use a signal which is obtained by summing signals of a plurality of scanning lines brings about the advantage that the contour compensation in the diagonal direction of the screen can be performed naturally.

Hence, in the fourth embodiment shown in FIG. 7, the image signals that is inputted to an input terminal 13 is delayed by 1H (one horizontal scanning period) by a 1H delay line 14 and this is outputted as the objective image signal from an output terminal 16, and the signal that has been delayed by 1H by the delay line 14 and the signal that has not been delayed are added by an adder 15 and are output from an output terminal 17 as the image signal for contour compensation.

FIG. 8 shows a fifth embodiment which is a modification of the image signal generation circuit for contour compensation. In FIG. 8, there are two 1H delay lines and the signal that has been delayed by 1H by the delay line 14 and the signal that has been delayed by a further 1H by a delay line 18 (to have a total delay of 2H) are added to the signal that has not been delayed, by an adder 19 with weight of 2, 1 and 1, respectively, and image signals for contour compensation is generated by the total of three horizontal scanning lines.

FIG. 9 shows a sixth embodiment which is still another modification.

In the first through third embodiments shown in FIGS. 3, 5 and 6, the signals that have been delayed by a time of $2t_d$ were generated by using the reflection by the high impedance at the output terminal of the delay line 3 but in the sixth embodiment shown in FIG. 9, the two delay lines 20 and 21 each having a delay amount of the time $t_d$ are used to generate the delay.

What is claimed is:

1. A contour compensation circuit comprising:
   first means for providing a first signal by delaying an input image signal by a predetermined time;
   second means for providing a second signal which represents a sum of the input image signal and the input image signal which has been delayed by twice the predetermined time;
   third means for providing a third signal by subtracting the second signal from the first signal;
   fourth means for controlling the magnitude of the third signal by using said second signal to output a magnitude-controlled signal; and
   fifth means for adding said first signal with said magnitude-controlled signal which is outputted from said fourth means, to thereby obtain a contour-compensated image signal.

2. The contour compensation circuit according to claim 1,
   wherein said first means comprises a delay line which delays said input image signal for said predetermined time, and
   wherein said second means comprises said delay line in which an output terminal is terminated with a substantially infinite impedance to reflect a delayed input image signal, and an input matching resistor which is connected to an input terminal of said delay line,
   so that said second signal is provided at the input terminal of the delay line.

3. The contour compensation circuit according to claim 1, wherein
   said first means comprises a first delay line which delays said input image signal for said predetermined time,
   said second means comprises a second delay line which is connected in series to said first delay line and an adder, and which further delays a delayed input image signal for said predetermined time to thereby define a further delayed input image signal, and said adder adds said input image signal and said further delayed input image signal.

4. The contour compensation circuit according to claim 1, wherein said fourth means comprises a voltage controlled amplifier (VCA) which controls the magnitude of said third signal so that, the higher a level of said second signal is, the larger the magnitude of said third signal becomes.

5. The contour compensation circuit according to claim 4, further comprising a low pass filter, through which said second signal is passed to control said third signal, thereby preventing said VCA from modulating said third signal by high-frequency components of said second signal.

6. A contour compensation circuit comprising:

first means for supplying a first signal by delaying a first input image signal for a predetermined time;

second means for supplying a second signal which represents a sum of said first input image signal and the first input image signal which has been delayed by twice the predetermined time;

third means for supplying a third signal by subtracting said second signal from said first signal;

fourth means for controlling the magnitude of said third signal in response to said second signal to output a magnitude-controlled signal;

fifth means for supplying a fourth signal by delaying a second input image signal related to said first input image signal by the predetermined time, the second input image signal being an objective signal to be counter-compensated; and sixth means for adding said magnitude-controlled signal which is outputted from said fourth means to said fourth signal which is outputted from said fifth means, to thereby obtain a contour-compensated image signal.

7. The contour compensation circuit according to claim 6, wherein said first input image signal is generated by summing said first input image signal and said first input image signal which has been kept apart in time by a horizontal scanning period.

8. The contour compensation circuit according to claim 6, further comprising a low pass filter, through which said second signal is passed to control said third signal, thereby preventing said fourth means from modulating said third signal by high-frequency components of said second signal.

* * * * *